US006768251B2

(12) United States Patent
Park

(10) Patent No.: US 6,768,251 B2
(45) Date of Patent: Jul. 27, 2004

(54) DEFLECTION YOKE

(75) Inventor: Byoung Jin Park, Suwon-shi (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 129 days.

(21) Appl. No.: 10/001,882

(22) Filed: Nov. 16, 2001

(65) Prior Publication Data

US 2003/0062817 A1 Apr. 3, 2003

(30) Foreign Application Priority Data

Sep. 28, 2001 (KR) ........................................ 2001-60367

(51) Int. Cl.[7] ................................................ H04N 5/645

(52) U.S. Cl. ........................ 313/440; 313/403; 313/456

(58) Field of Search ................................ 313/440, 403, 313/456, 402, 404, 482, 261, 281, 414, 412; 348/830, 829, 831

(56) References Cited

U.S. PATENT DOCUMENTS 5,745,348 A * 4/1998 Cha ........................... 313/440
5,777,699 A * 7/1998 Shim .......................... 348/830

* cited by examiner

*Primary Examiner*—Nimeshkumar D. Patel
*Assistant Examiner*—Ken A Berck
(74) *Attorney, Agent, or Firm*—Darby & Darby

(57) ABSTRACT

The present invention relates to a deflection yoke. According to the invention, in particular, anti-release means is provided in upper hook pieces formed in sides of a rear cover thereby preventing a printed circuit board from easy separation from the rear cover in fixing therebetween so that the assembling ability and productivity can be enhanced.

6 Claims, 14 Drawing Sheets

DEFLECTION YOKE

BACKGROUND OF THE INVENTION

1. Field of the Invention

The present invention relates to a deflection yoke, in particular, which can improve an assembly structure of a printed circuit board thereby preventing release thereof while enhancing the productivity.

2. Description of the Prior Art

In general, a Cathode Ray Tube (CRT) in a television or a monitor has a deflection yoke for correctly deflecting RGB beams scanned from an electron gun to a fluorescent screen applied on a screen of the CRT. Such a deflection yoke as one of the most important magnetic components in the CRT serves to deflect the electron beams from the electron gun so that electric signals transmitted in time sequence can be reproduced as images on the screen of the CRT.

In other words, since the electron beams projected from the electron gun directly move onto the screen via a high voltage to light only central phosphors in the screen, the deflection yoke externally deflects the electron beams in the order of scanning. Here, the deflection yoke forms a magnetic field to deflect the electron beams correctly to the fluorescent screen applied on the screen of the CRT based on the fact that the electrons are forced to change the path thereof while passing through the magnetic field.

FIG. 1 is a side elevation view for showing a general CRT. As shown in FIG. 1, a deflection yoke 4 is placed in an RGB electron gun section 3 of the CRT 1 to deflect electron beams scanned from an electron gun 3*a* to a fluorescent screen applied on a screen surface 2.

Such a deflection yoke 4 comprises coil separator 10 constituted by a pair of symmetric upper and lower parts which are coupled into one unit.

The coil separator 10 is provided to insulate a horizontal deflection coils 15 and a vertical deflection coils 16 while assembling the positions thereof in a suitable degree, and comprised of a screen portion 11*a* for being coupled to a screen surface side of the CRT 1, a rear cover 11*b* and a neck portion 12 integrally extended from a central surface of the rear cover 11*b* for being coupled to the electron gun section 3 of the CRT 1.

The coil separator 10 is respectively provided in the inner and outer peripheries with the horizontal deflection coils 15 and the vertical deflection coils 16 for forming a horizontal magnetic field and a vertical magnetic field via externally applied power.

Further, a pair of ferrite cores 14 made of a magnetic substance are installed to wrap the vertical deflection coil 16 to strengthen a vertically deflected magnetic field generated from the vertical deflection coil 16.

The deflection yoke 4 configured like this is installed in the neck portion 12 of the CRT 1, and when the horizontal deflection coil 15 and the vertical deflection coil 16 are applied with a sawtooth wave pulse, generates the magnetic field based on the Fleming's left hand rule to deflect the RGB electron beams emitted from the electron gun 3*a* of the CRT for determination of scanning positions on the screen through.

Meanwhile, the deflection yoke as shown in FIG. 1 is classified into a saddle-saddle type deflection yoke as shown in FIGS. 2 and 3 and a saddle-toroidal type deflection yoke as shown in FIGS. 4 and 5 according to the winding structure of the coils.

In this case, the saddle-saddle type deflection yoke as shown in FIGS. 2 and 3 comprises saddle type deflection coils 15 installed in the upper and lower sides of the inner periphery of a screen portion of a substantially conical coil separator and saddle type vertical deflection coils 16 installed in right and left sides of the outer periphery thereof.

In order to strengthen the magnetic field of the vertical deflection coils 16, the coil separator 10 is provided in the outer periphery of the screen portion 11*a* with a substantially cylindrical ferrite core 14.

Further, around the outer periphery of the neck portion 12 of the coil separator 10 is provided a coma-free coil (not shown) for compensating coma generated from the vertical deflection coils 16.

FIGS. 4 and 5 show a general saddle-toroidal type deflection yoke. In the saddle-toroidal type deflection yoke, horizontal deflection coils 15 are installed in the upper and lower sides of the inner periphery of a screen portion 11*a* of a substantially conical coil separator 10, a substantially cylindrical ferrite core 14 is provided in the outer periphery, and vertical deflection coils 16 are wound along the upper and lower sides of the ferrite core 14.

Further, around the outer periphery of a neck portion 12 of the coil separator 10 is additionally installed a coma-free coil (not shown) for compensating coma generated from the vertical deflection coils 16.

Besides, each of the saddle-saddle type and saddle-toroidal type deflection yokes has a printed circuit board installed in one side of the coil separator 10 for supplying power to the foregoing horizontal deflection coils 15 and the vertical deflection coils 16.

FIGS. 6 and 7 show an assembly structure of a printed circuit board in a deflection yoke of the prior art. As shown in FIGS. 6 and 7, a coil separator 10 has a rear cover 11*b* coupled with the printed circuit board 100 for electrically connecting deflection coils and various electric instruments.

The printed circuit board 100, as shown in FIG. 6, comprises slide grooves 110 formed in an upper part with a predetermined interval and through-holes 120 formed at a predetermined interval under the slide groove 110, in which the slide grooves 110 and the through-holes 120 are typically provided in a pair. Mean while, as shown in FIG. 6, each of the slide grooves 110 has a U-shape, and each of the through-holes is provided as a substantially rectangular hole.

Such a printed circuit board 100 is fitted and coupled into a number of hook pieces 200 provided on the rear cover 11*b*, in which the hook pieces 200 are constituted by upper hook pieces 210 and lower hook pieces 220 respectively formed at positions corresponding to the slide grooves 110 and the through-holes 120.

In this case, the upper and lower hook pieces 210 and 220 are inserted into the slide grooves 110 and the through-holes 120 formed in the printed circuit board 100 to fix the printed circuit board to the rear cover 11*b*. Such upper and lower hook pieces 210 and 220 have ribs r1 and r2 and triangular piece-shaped protrusions p1 and p2 which are integrally formed at an interval corresponding to the thickness of the printed circuit board 100 for contacting to front and rear sides of the printed circuit board 100 for support thereof.

Meanwhile, the protrusions p1 and p2 are projected from the leading ends of the upper and lower hook pieces 210 and 220 in triangular shape and have sizes that allow interference fit into the slide grooves 110 and the through-holes 120, and in particular, the protrusions p1 in the upper hook pieces 210 are projected as opposed to the protrusions p2 in the lower hook pieces 220. Further, the ribs r1 and r2 are projected at positions distanced from the protrusions p1 and p2 at an interval corresponding to the thickness of the printed circuit board.

The upper and lower hook pieces 210 and 220 with the foregoing protrusions pl and p2 and the ribs r1 and r2 have an interval that is slightly wider than that of the pair of slide grooves 110 and the pair of through-holes 120 for enabling elastic fastening thereof.

The conventional deflection yoke configured as above can be fixed through insertion of the slide grooves 110 and the through-holes 120 of the printed circuit board 100 into the upper and lower hook pieces 210 and 220 which are integrally projected from the rear cover 11*b*.

However, in the convention deflection yoke like this, the printed circuit board 100 and the rear cover 11 are coupled through a fitting structure, in which assembly thereof is extraordinarily difficult due to the structures of the upper and lower hook pieces 210 and 220, the slide grooves 110 and through-holes 120 so that a problem is incurred that the workability and the productivity are degraded.

In other words, when the printed circuit board 100 is assembled to the rear cover 11*b*, as shown in FIG. 7, the lower end of the printed circuit board 100 is moved toward the lower hook pieces 220 as the upper end thereof is inclined at a certain angle toward the upper hook pieces 210 and temporarily supported in this posture. In this case, the slide grooves 110 of the printed circuit board 100 may not maintain stable support from the upper hook pieces 210 thereby tending to be easily released or separated.

Therefore, in carrying out the processes of assembly, an operator should pay considerable attention so that the slide grooves 110 may not be separated from the upper hook pieces 210 when the lower end is displaced toward the lower hook pieces 220 as the upper end of the printed circuit board 100 is temporarily assembled, so that the workability and productivity are degraded in a large margin as drawbacks.

SUMMARY OF THE INVENTION

Accordingly, the present invention has been proposed to solve the foregoing problems of the prior art and it is an object of the invention to provide a deflection yoke which can prevent release of a printed circuit board in fixing the same on a rear cover thereby enhancing the assembling ability and the productivity.

According to an embodiment of the invention to solve the foregoing object, it is provided a deflection yoke, comprising: a coil separator a screen portion coupled to a screen surface of a CRT, a rear cover and a neck portion extended from a central surface of the rear cover for being coupled to an electric gun of the CRT; horizontal and vertical deflection coils provided in the inner and outer peripheries of the coil separator for forming horizontally and vertically deflected magnetic fields; a printed circuit board coupled to the rear cover of the coil separator, and having a number of slide grooves with a certain size of separator piece in an upper part, the slide grooves being connected to an edge, and a plurality of through-holes at a certain interval under the slide grooves; upper hook pieces projected from a side of the rear cover, each of the upper hook pieces having a rib at one ends contacting to one side of the printed circuit board and a protrusion for penetrating one of the slide grooves to contact to aid printed circuit board; lower hook pieces provided at one sides of the upper hook pieces, each of the lower hook pieces having a rib and a protrusion for penetrating the through-holes of the printed circuit board to support both sides thereof; and anti-release means for projecting the protrusions of an adjacently arranged pair of the upper hook pieces to a mutually opposed direction to supportingly receive the separator piece provided between a pair of the slide grooves.

It is preferred that the anti-release means are anti-release fitting lugs integrally extended from the protrusions of the upper hook pieces.

According to another embodiment of the invention to solve the foregoing object, it is provided a deflection yoke, comprising: a coil separator a screen portion coupled to a screen surface of a CRT, a rear cover and a neck portion extended from a central surface of the rear cover for being coupled to an electric gun of the CRT; horizontal and vertical deflection coils provided in the inner and outer peripheries of the coil separator for forming horizontally and vertically deflected magnetic fields; a printed circuit board coupled to the rear cover of the coil separator, and having a number of slide grooves with a certain size of separator piece in an upper part, the slide grooves being connected to an edge, and a plurality of through-holes at a certain interval under the slide grooves; upper hook pieces projected from a side of the rear cover, each of the upper hook pieces having a rib at one ends contacting to one side of the printed circuit board and a protrusion for penetrating one of the slide grooves to contact to the printed circuit board; lower hook pieces provided at one sides of the upper hook pieces, each of the lower hook pieces having a rib and a protrusion for penetrating the through-holes of the printed circuit board to support both sides thereof; and anti-release means for mutually connecting the protrusions of an adjacently arranged pair of the upper hook pieces to supportingly receive the separator piece between the pair of upper hook pieces.

It is preferred that the anti-release means is an anti-release connector piece in which the protrusions of the pair of upper hook pieces are connected in a mutually opposed direction.

According to still another embodiment of the invention to solve the foregoing object, it is provided a deflection yoke, comprising: a coil separator a screen portion coupled to a screen surface of a CRT, a rear cover and a neck portion extended from a central surface of the rear cover for being coupled to an electric gun of the CRT; horizontal and vertical deflection coils provided in the inner and outer peripheries of the coil separator for forming horizontally and vertically deflected magnetic fields; a printed circuit board coupled to the rear cover of the coil separator, and having a number of slide grooves with a certain size of separator piece in an upper part, the slide grooves being connected to an edge, and a plurality of through-holes at a certain interval under the slide grooves; upper hook pieces projected from a side of the rear cover, each of the upper hook pieces having a rib at one ends contacting to one side of the printed circuit board and a protrusion for penetrating one of the slide grooves to contact to the printed circuit board; lower hook pieces provided at one sides of the upper hook pieces, each of the lower hook pieces having a rib and a protrusion for penetrating the through-holes of the printed circuit board to support both sides thereof; and anti-release means for projecting the protrusions of the upper hook pieces in an opposed direction to contact to one sides of the slide grooves.

It is preferred that the anti-release means are anti-release fitting lugs which are integrally provided to the protrusions of the upper hook pieces.

DESCRIPTION OF THE PREFERRED EMBODIMENTS

Figure 1:
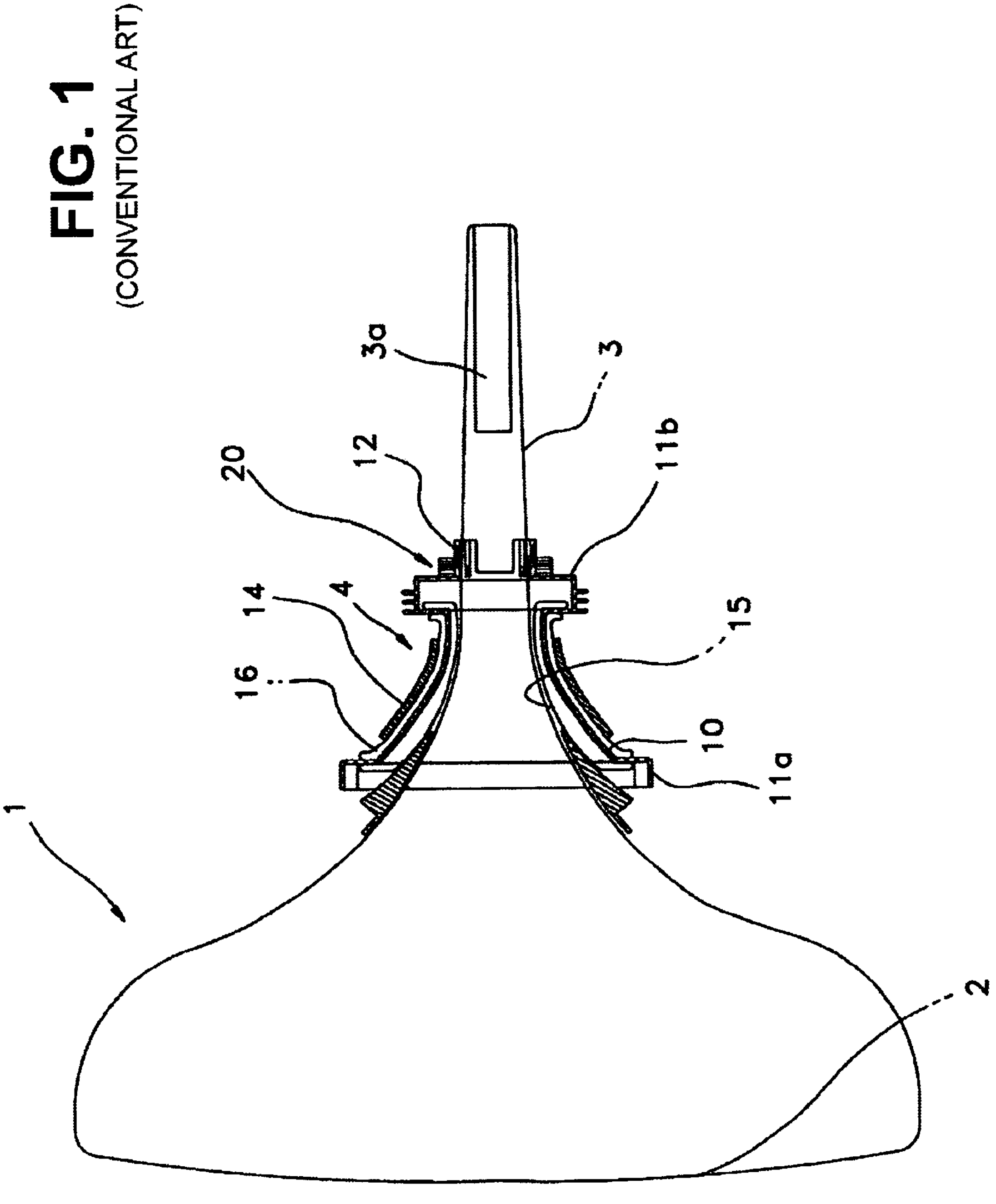
FIG. 1 (CONVENTIONAL ART)
FIG. 1 is a side elevation view for showing a general CRT.
Figure 2:
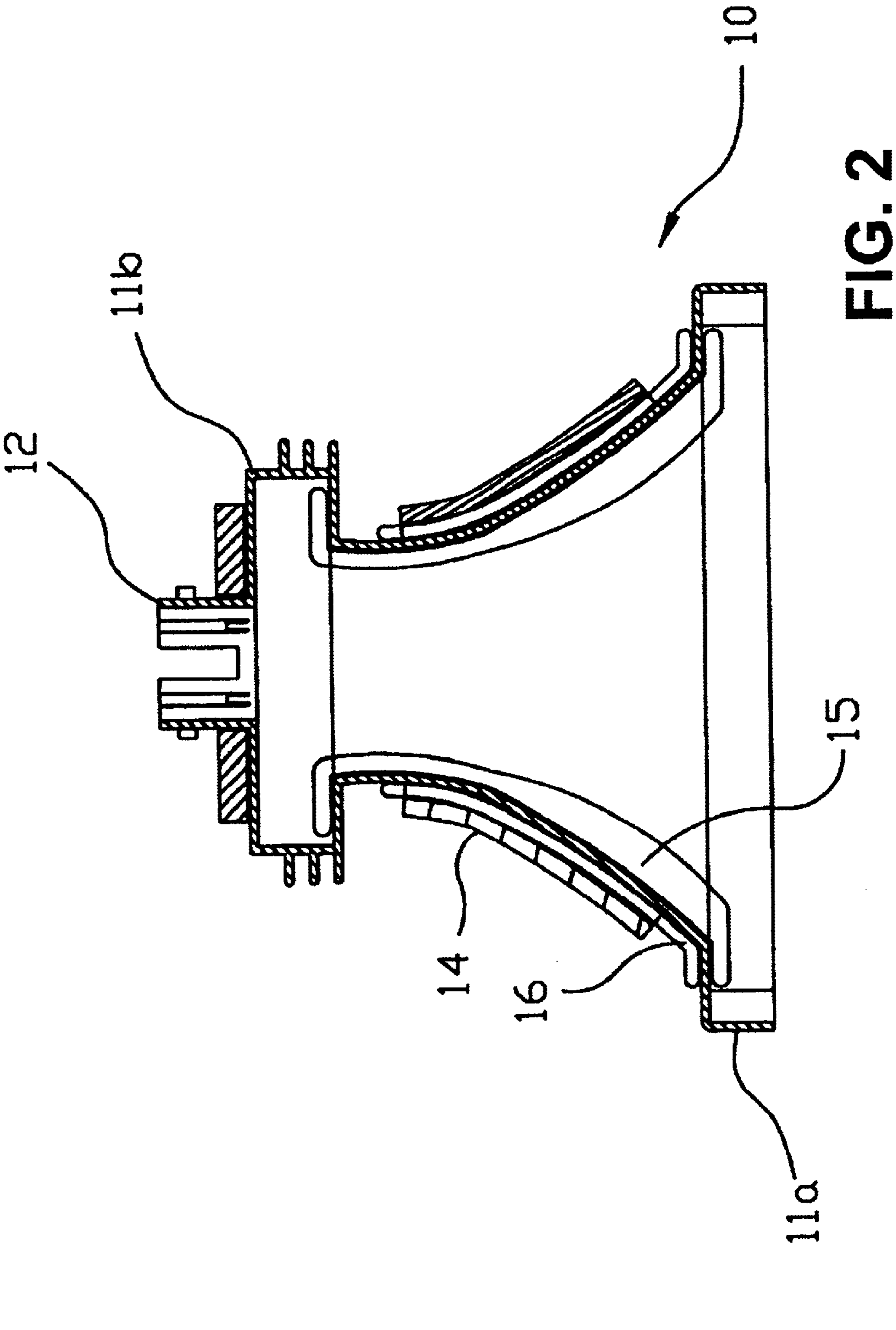
FIG. 2 (CONVENTIONAL ART)
FIGS. 2 and 3 are front and plan sectional views for showing a general saddle-saddle type deflection yoke.
Figure 3:
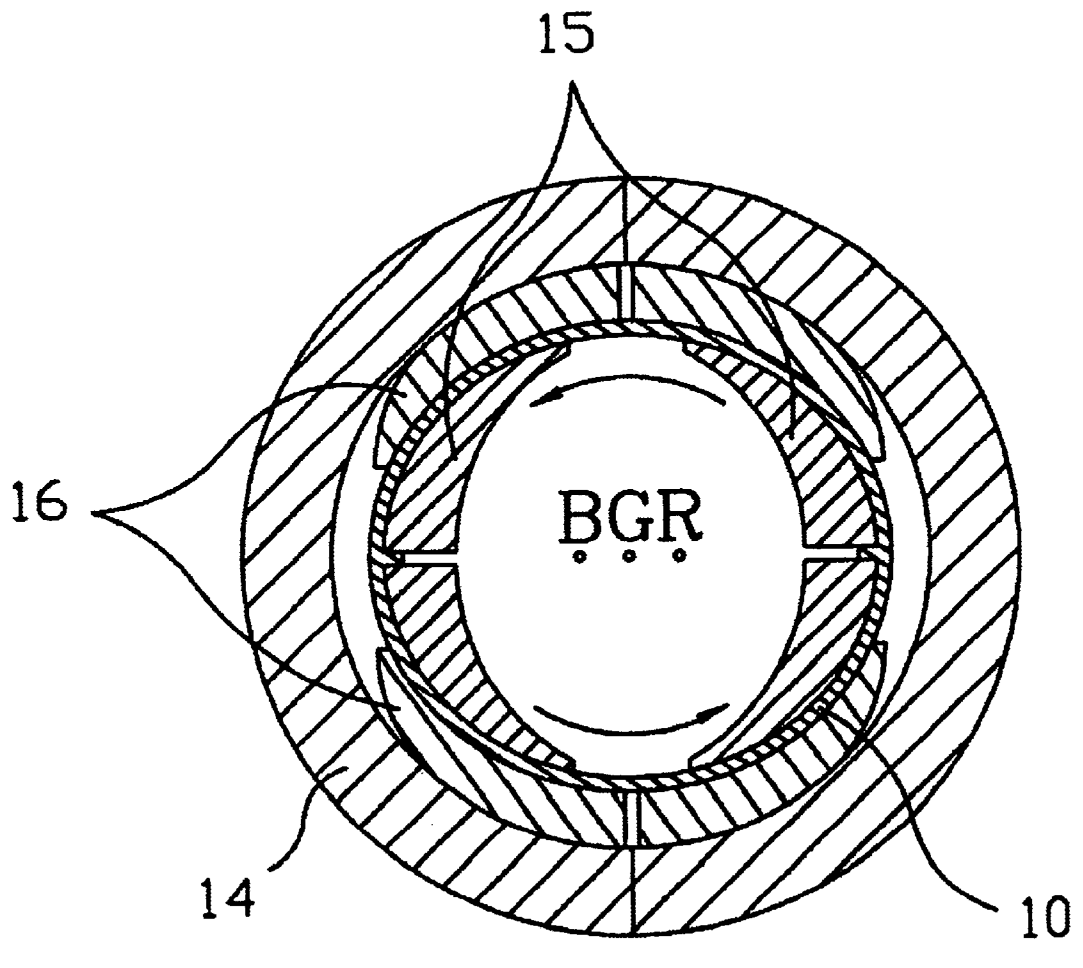
FIG. 3 (CONVENTIONAL ART)
Figure 4:
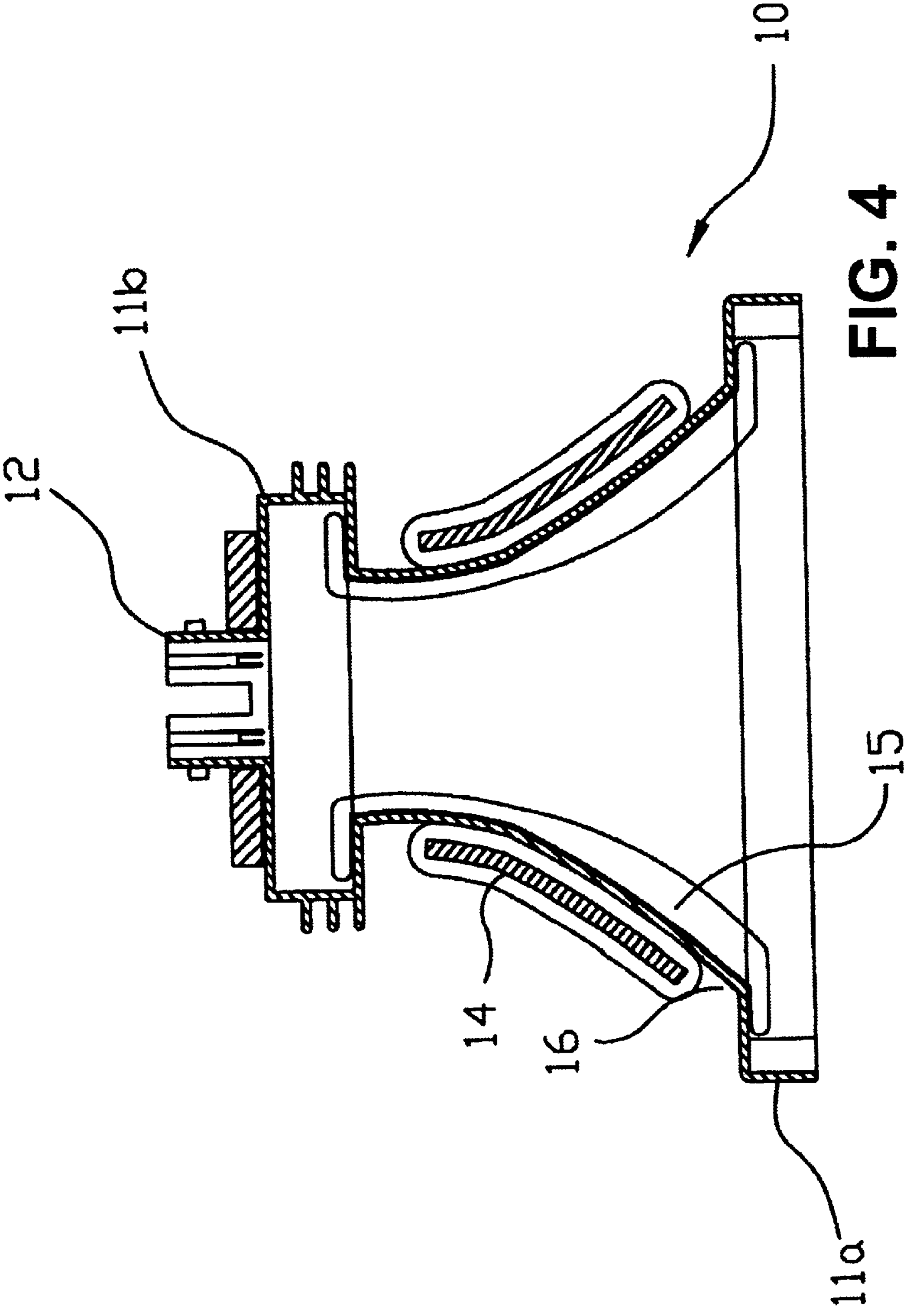
FIG. 4 (CONVENTIONAL ART)
FIGS. 4 and 5 are front and plan sectional views for showing a general saddle-toroidal type deflection yoke.
Figure 5:
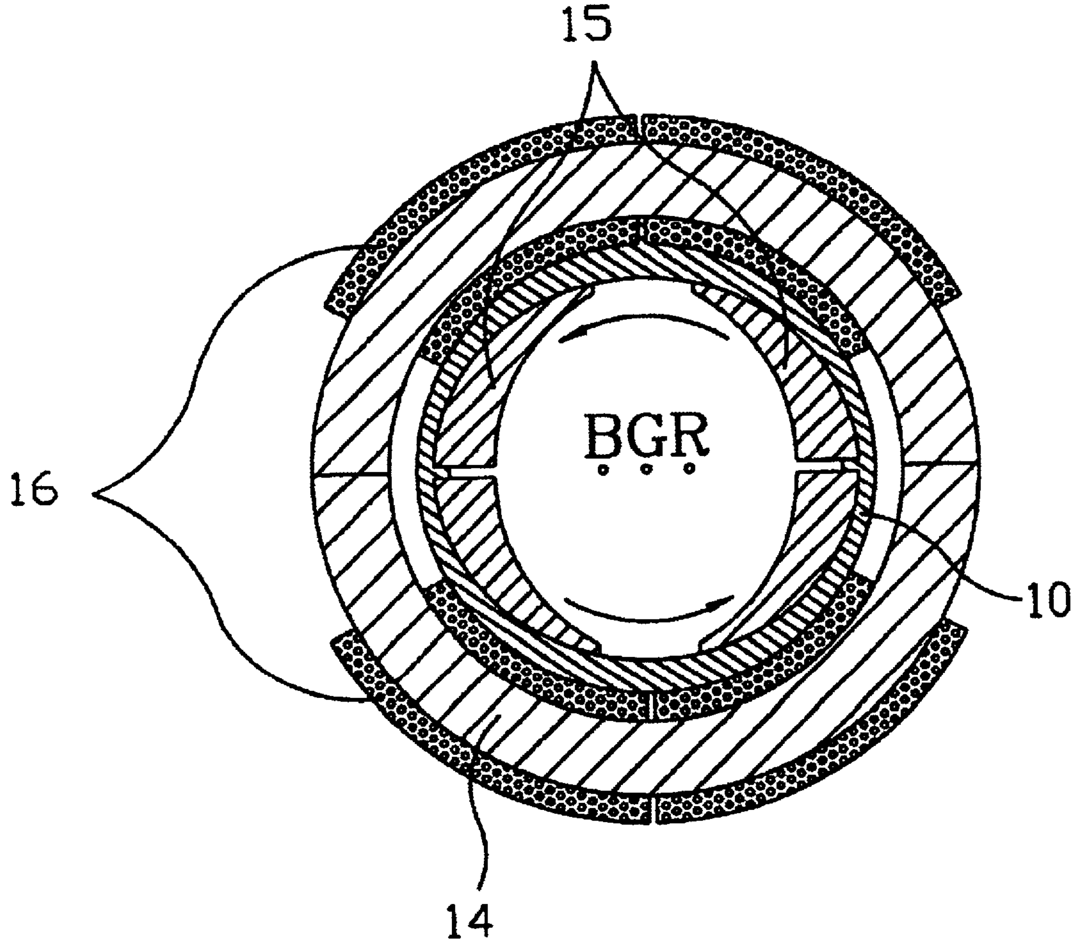
FIG. 5 (CONVENTIONAL ART)
Figure 6:
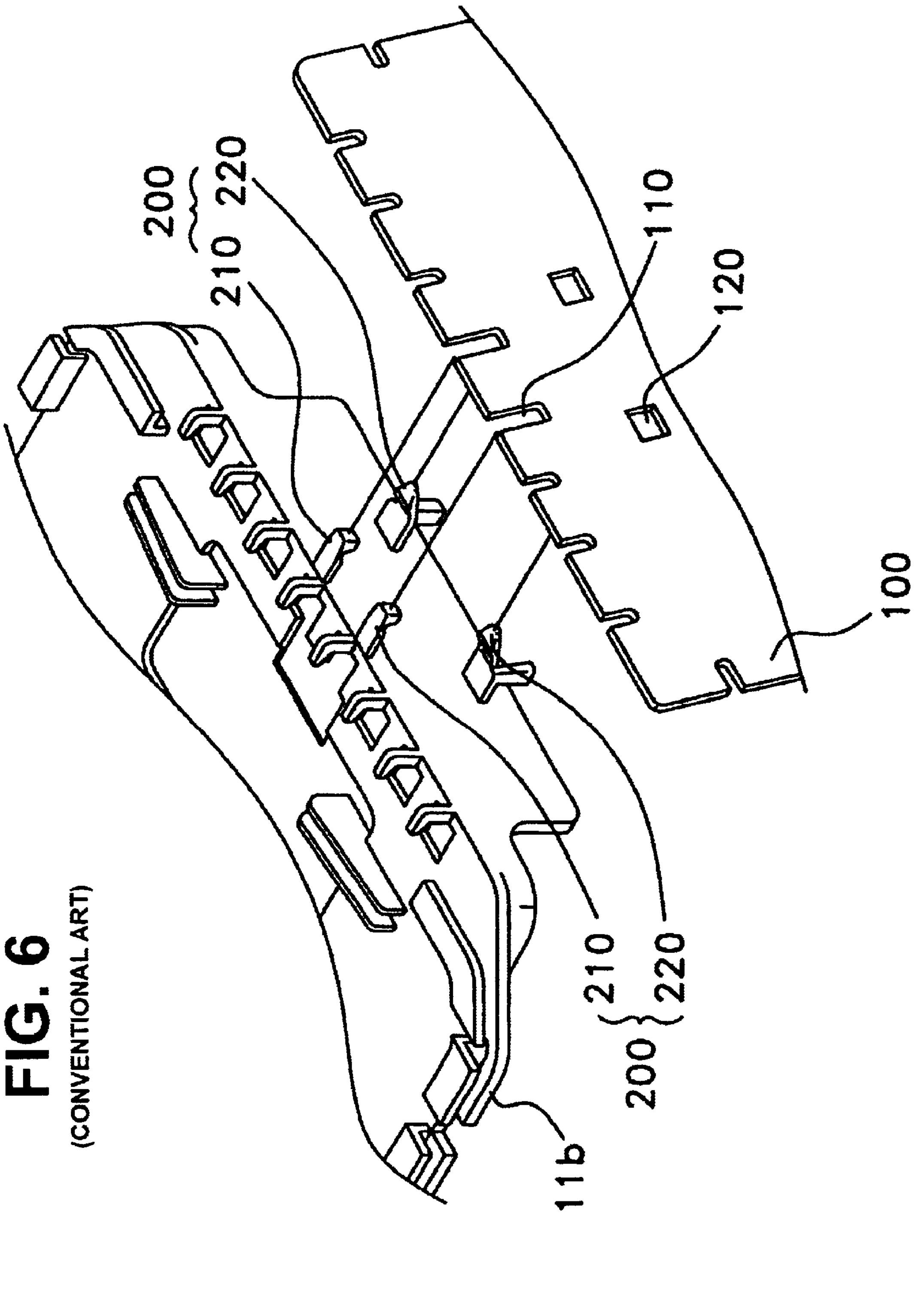
FIG. 6 (CONVENTIONAL ART)
FIGS. 6 and 7 show an assembly structure of a printed circuit board in a deflection yoke of the prior art.
Figure 7:
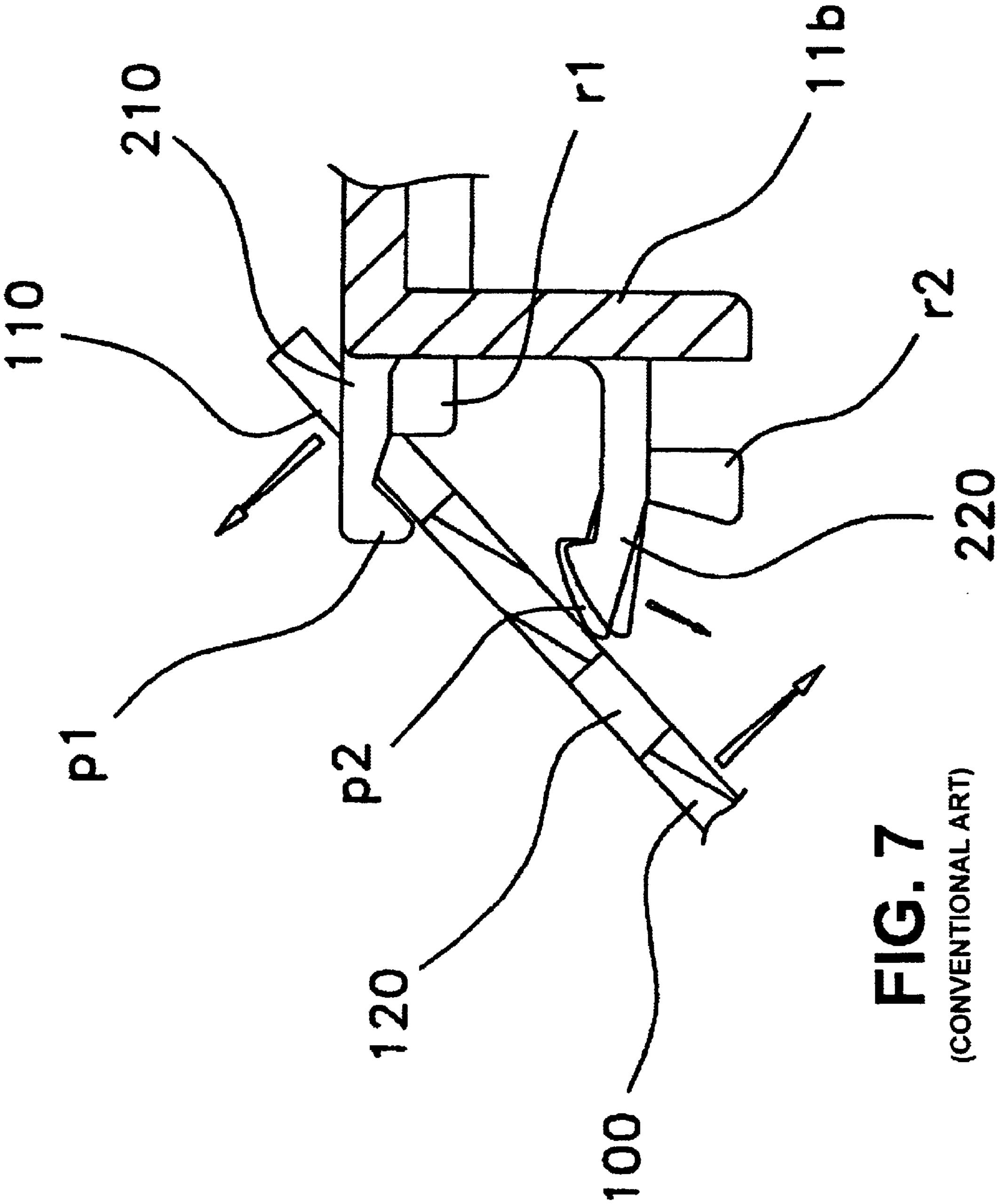
FIG. 7 (CONVENTIONAL ART)

First, referring to FIGS. 1 to 5, each of general deflection yokes 4 is placed in an RGB electron gun section 3 of a CRT 1 for deflecting electron beams scanned from an electron gun 3*a* to a fluorescent screen coated on a screen surface 2, and generally classified into a saddle-saddle type deflection yoke as shown in FIGS. 2 and 3 and a saddle-toroidal type deflection yoke as shown in FIGS. 4 and 5 according to the winding structure of coils.

Such a deflection yoke 4 functions to deflect the electron beams that are projected from the RGB electron gun 3*a* installed in a neck portion 12 of the CRT 1 rightward, leftward, upward and downward to be collided on correct positions on the fluorescent surface of the CRT.

FIGS. 2 and 3 show a general saddle-saddle type deflection yoke. As shown in FIGS. 2 and 3, the saddle-saddle type deflection yoke has saddle-type horizontal deflection coils 15 installed in upper and lower sides of the inner periphery of a screen portion 11*a* of a substantially conical-shaped coil separator 10 and saddle-type vertical deflection coil 16 installed in right and left sides of the outer periphery of the coil separator 10.

The coil separator 10 is provided in the outer periphery of the screen portion 11*a* with a substantially cylindrical ferrite core 14 for reinforcing a magnetic field of the vertical deflection coils 16.

Further, the coil separator 10 is provided around the outer periphery of the neck portion 12 with a coma-free coil (not shown) for compensating coma generated by the vertical deflection coils 16.

FIGS. 4 and 5 show a general saddle-toroidal type deflection yoke. As shown in FIGS. 4 and 5, the saddle-toroidal type deflection yoke has horizontal deflection coils 15 in upper and lower sides of the inner periphery of a screen portion 11*a*, a substantially cylindrical ferrite core 14 in the outer periphery of the screen portion 11*a* and toroid-shaped vertical deflection coils 16 wound along upper and lower sides of the ferrite core 14.

Further, the coil separator 10 is additionally provided around the outer periphery of a neck portion 12 with a coma-free coil (not shown) for compensating coma generated from the vertical deflection coils 16.

In addition, each the saddle-saddle type and saddle-toroidal type deflection yokes is provided at one side of the coil separator 10 with a printed circuit board for supplying power to the foregoing horizontal deflection coils 15 and the vertical deflection coils 16.

Meanwhile, in each the foregoing deflection yokes 4, the printed circuit board 100 is coupled to a side of a rear cover 11*b* of the coil separator 10 for electrically connecting the horizontal deflection coils 15, the vertical deflection coils 16 and various electrical instruments, and externally supplied with power.

FIGS. 8 to 14 are drawings for showing various embodiments for assembly of a rear cover and a printed circuit board according to the invention.

As shown in FIGS. 8 to 14, the printed circuit board 30 has a plurality of slide grooves 31 with a predetermined interval at both upper sides, in which each of the slide grooves 31 is provided in the form of a slit downwardly extended from the upper edge of the printed circuit board 30. Such slide grooves 31 are provided in plural having the predetermined interval, and in a pair according to the invention.

Further, the printed circuit board 30 is provided under the slide grooves 31 with a pair of through-holes 32, each of which has a substantially rectangular shape.

Like this, in positions corresponding to the slide grooves 31 and the through-holes in the printed circuit board 30, a plurality of hook pieces 40 are provided in a rear cover 11*b* for enabling stable fixture with the printed circuit board 30.

In this case, the hook pieces 40 are generally constituted by upper hook pieces 41 corresponding to the slide grooves 31 and lower hook pieces 42 corresponding to the through-holes 32.

In this case, the upper hook pieces 41 are provided in a side of the rear cover 11*b* corresponding to the slide grooves of the printed circuit board 30, and in a pair also for enabling respective insertion into the pair of slide grooves 31. Further, the lower hook pieces 42 are provided under the slide grooves 31 in one side of the rear cover 11*b* corresponding to the foregoing through-holes 32 of the printed circuit board 30.

Meanwhile, as shown in the drawings, the upper hook pieces 41 and the lower hook pieces 42 are adapted to have protrusions p1 and p2 and ribs r1 and 42 at a predetermined interval so that the upper hook pieces 41 and the lower hook pieces 42 can effect a supporting force as contacted to both sides of the printed circuit board while penetrated the slide grooves 31 and the through-holes 32.

In this case, the protrusions p1 and p2 are respectively projected with a predetermined size from the ends of the hook pieces 40, and the ribs r1 and r2 are provided at predetermined positions with a predetermined interval from the protrusions p1 and p2 for supporting the other side of the printed circuit board 30 so as to prevent play of the printed circuit board 30 together with the protrusions p1 and p2.

In other words, the protrusions p1 and p2 and the ribs r1 and r2 contact to the front and rear sides of the printed circuit board about the slide grooves 31 and the through-holes 32 to prevent play of the printed circuit board 30, and the protrusions p1 and p2 and the ribs r1 and r2 have an interval substantially proportional to the thickness of the printed circuit board 30.

Meanwhile, the mutual interval of the pair of upper hook pieces 41 and the lower hook pieces 42 configured as above is slightly wider than that of the pair of slide grooves 31 and the through-holes 32 so that the hook pieces 41 and 42 can be elastically inserted into the slide grooves 31 and the through-holes 32.

In the upper and lower hook pieces 41 and 42 configured as above, when the protrusions p1 and p2 in the ends penetrate the slide grooves 31 and the through holes 32, one sides of the protrusions p1 and p2 contact to one sides of the printed circuit board 30, and the ribs r1 and r2 having the predetermined interval from the protrusions p1 and p2 contact to the other side of the printed circuit board 30.

Therefore, the both sides of the printed circuit board 30 contact to the protrusions p1 and p2 and the ribs r1 and r2 of the hook pieces 41 and 42 about the slide grooves 31 and the through-holes 32 to prevent play of the printed circuit board 30 when coupled to the rear cover 11*b*.

Meanwhile, one side of the each protrusion p1 is extendedly projected to provide anti-release means for easier assembly of the printed circuit board 30.

Figure 8:
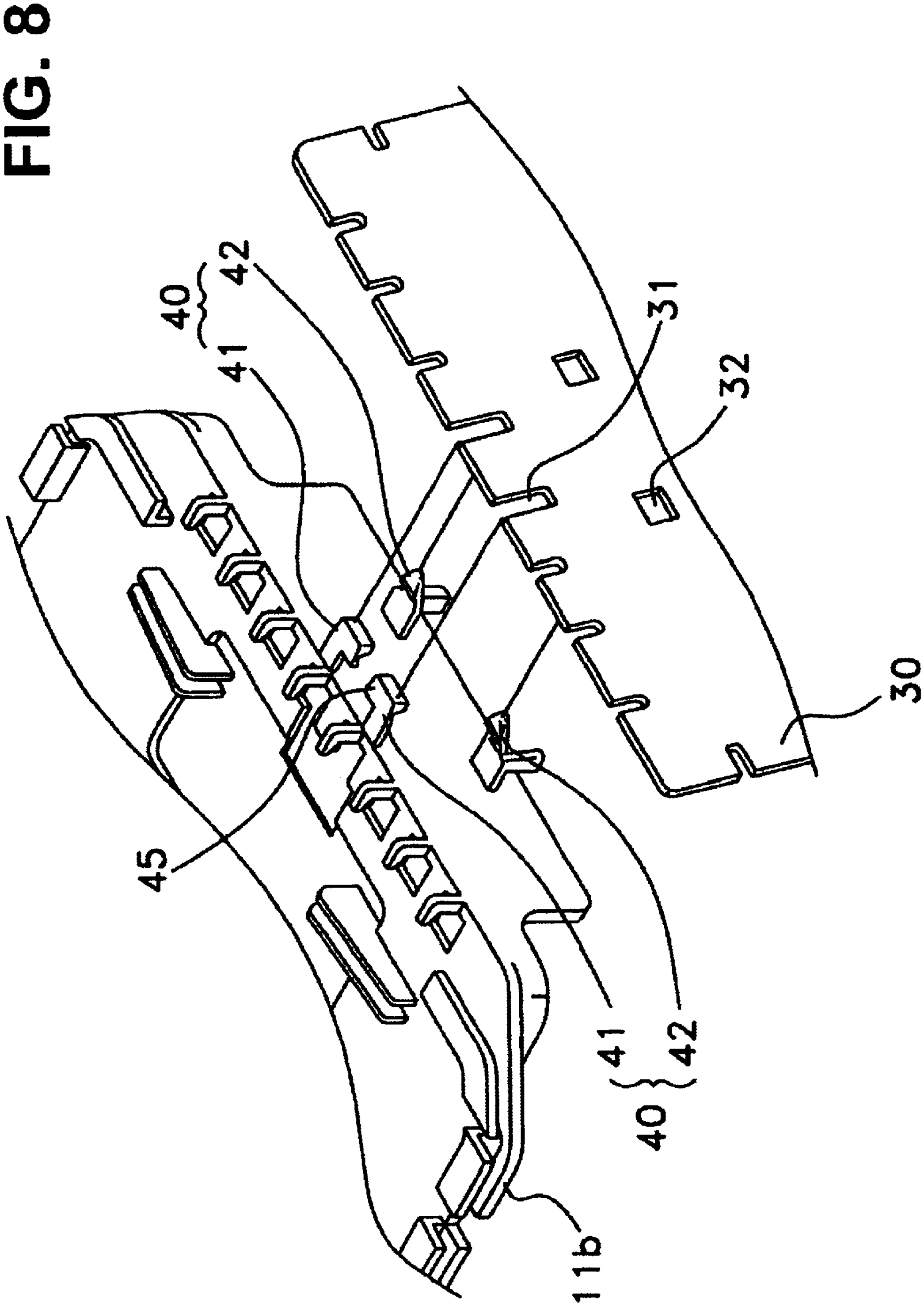
FIGS. 8 and 9 are perspective and plan views for showing an embodiment of a rear cover and a printed circuit board in a deflection yoke of the invention.
Figure 9:
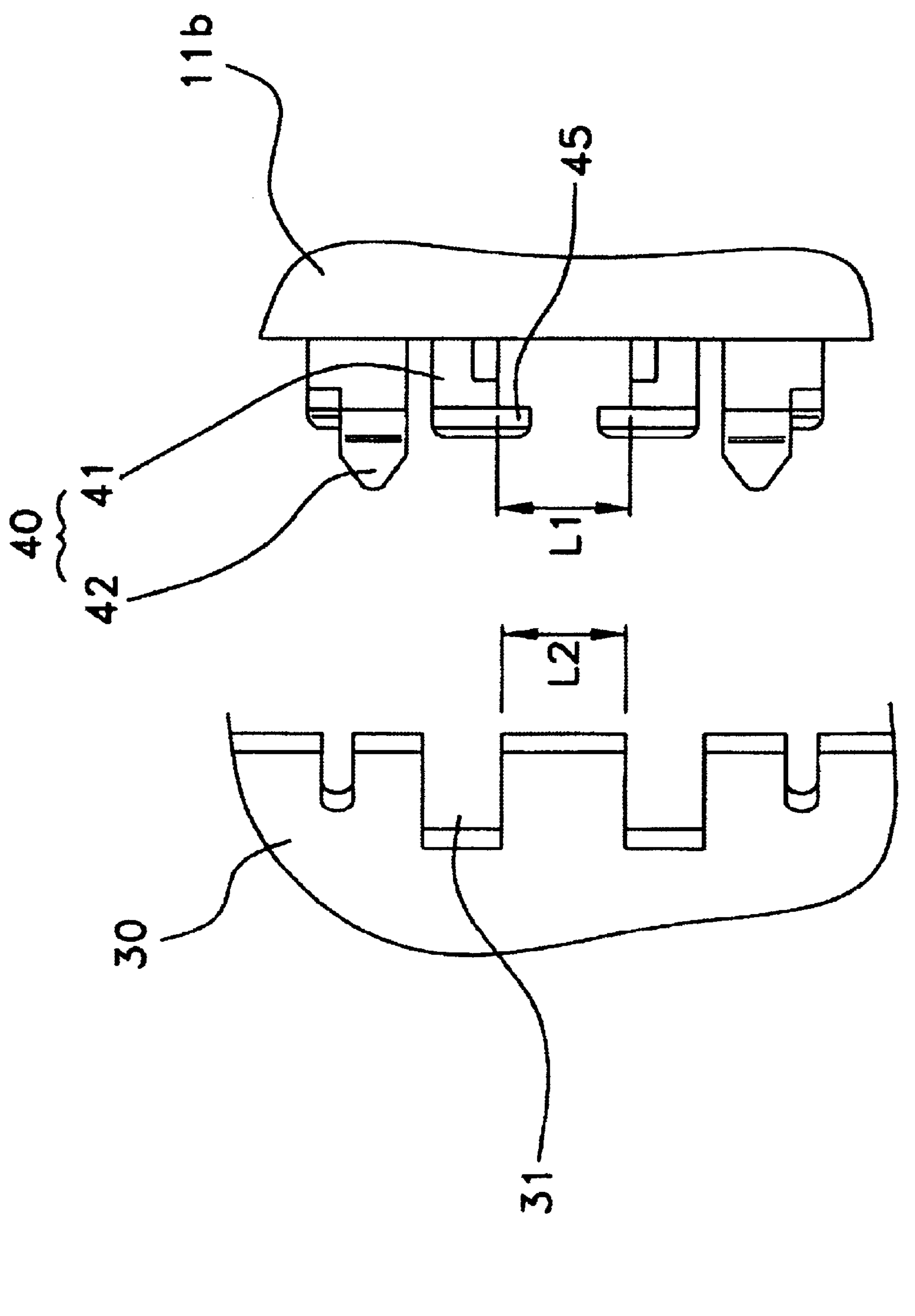

FIGS. 8 and 9 show an embodiment of the anti-release means in the deflection yoke according to the invention, in which the anti-release means has a predetermined size of space L1 between the pair of hook pieces 41 and a separator piece L2 provided between the pair of slide grooves 31 so that the separator piece L2 can be inserted into the space L1.

In the foregoing anti-release means, the protrusions p1 in the adjacently arranged pair of upper hook pieces 41 are extended as opposed at a predetermined length to integrally provide anti-release fitting lugs 45. In this case, each of the anti-release fitting lugs 45 may have the sectional shape of triangle, rectangle or circle.

When the anti-release fitting lugs 45 are provided in the adjacent pair of upper hook 41, the space L1 for receiving the separator piece L2 is formed as shown in FIG. 9 thereby preventing easy release of the printed circuit board 30 from the pair of upper hook pieces 41 during the assembly.

Figure 10:
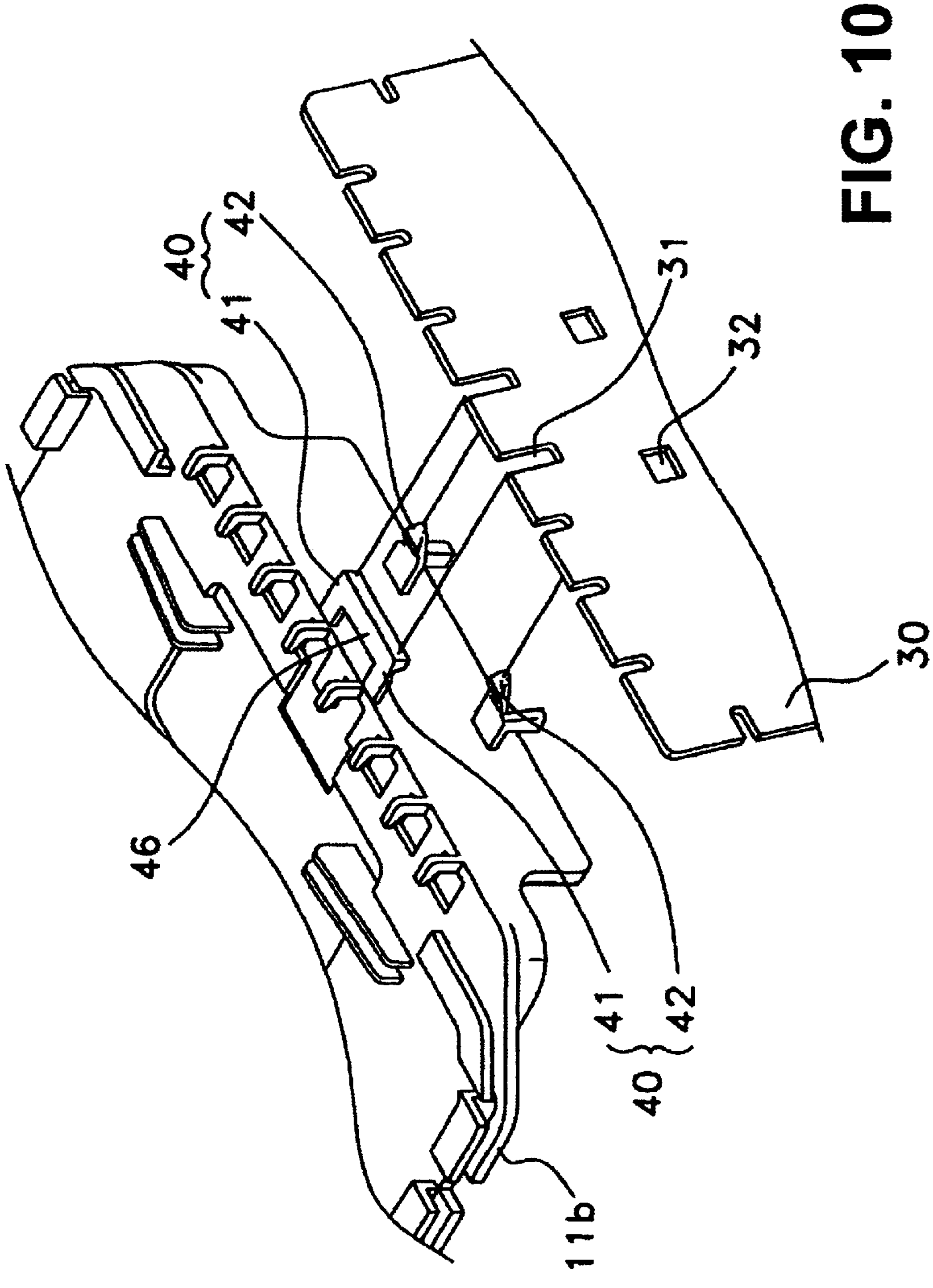
FIGS. 10 and 11 are perspective and plan views for showing another embodiment of a rear cover and a printed circuit board in a deflection yoke of the invention.
Figure 11:
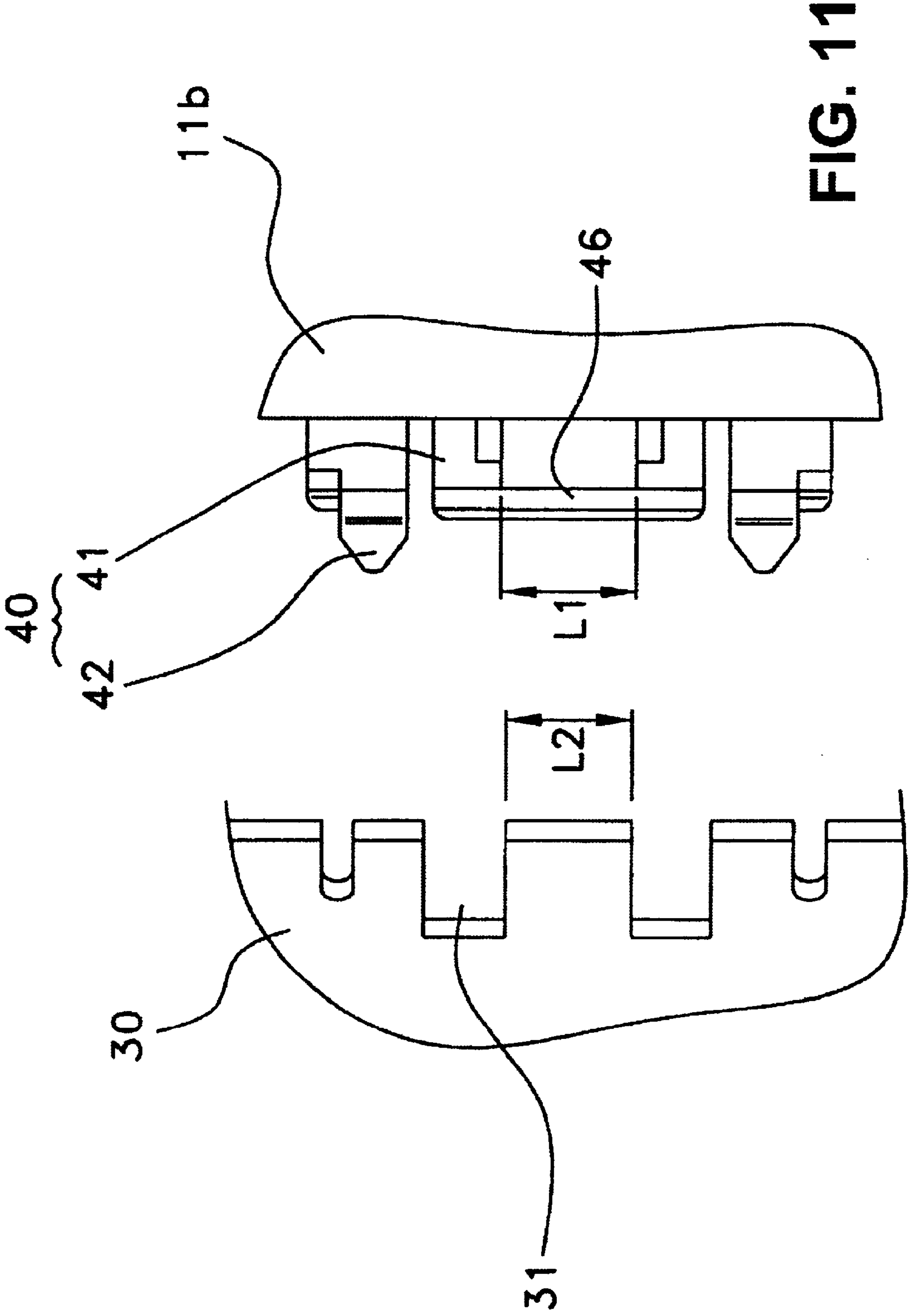

FIGS. 10 and 11 show another embodiment of the anti-release means in the deflection yoke according to the invention. As shown in FIGS. 10 and 11, in the anti-release means may, the protrusions p1 of the adjacently arranged pair of upper hook pieces 41 may be connected along a direction opposed to each other to provide an anti-release connector pin 46.

When the anti-release connector pin 46 is provided like this, a space L1 is formed between the pair of upper hook pieces so that a separator piece L2 can be inserted, such a configuration prevents the printed circuit board 30 from easy release from the rear cover 11*b* during the assembly thereof.

Such anti-release means can be modified into various configurations if it has a structural feature of being integrally extended from the protrusions p1 to contact to one sides of the slide grooves 31 of the printed circuit board 30 for prevention of release.

Figure 12:
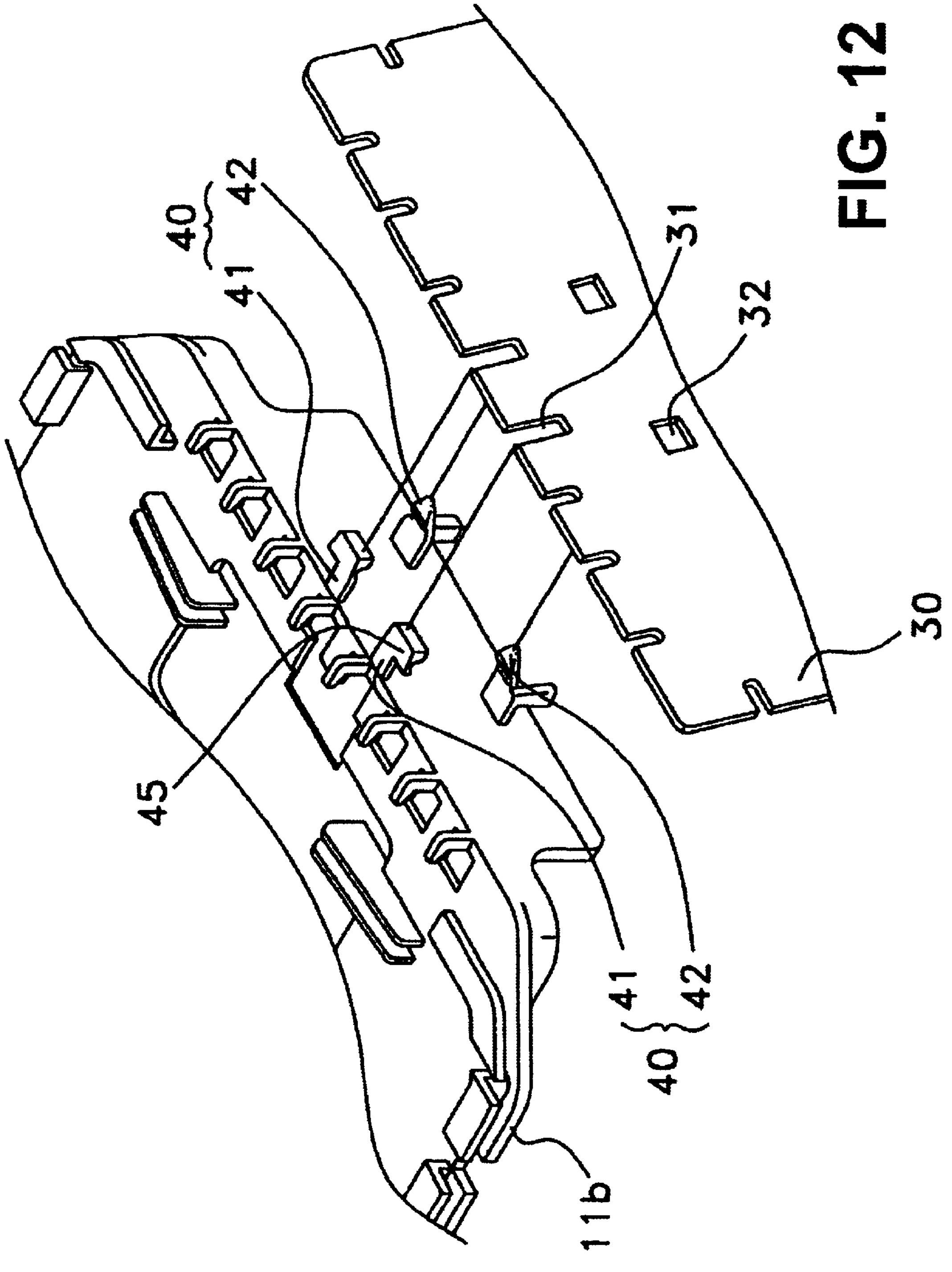
FIGS. 12 and 13 are perspective and plan views for showing further another embodiment of a rear cover and a printed circuit board in a deflection yoke of the invention.
Figure 13:
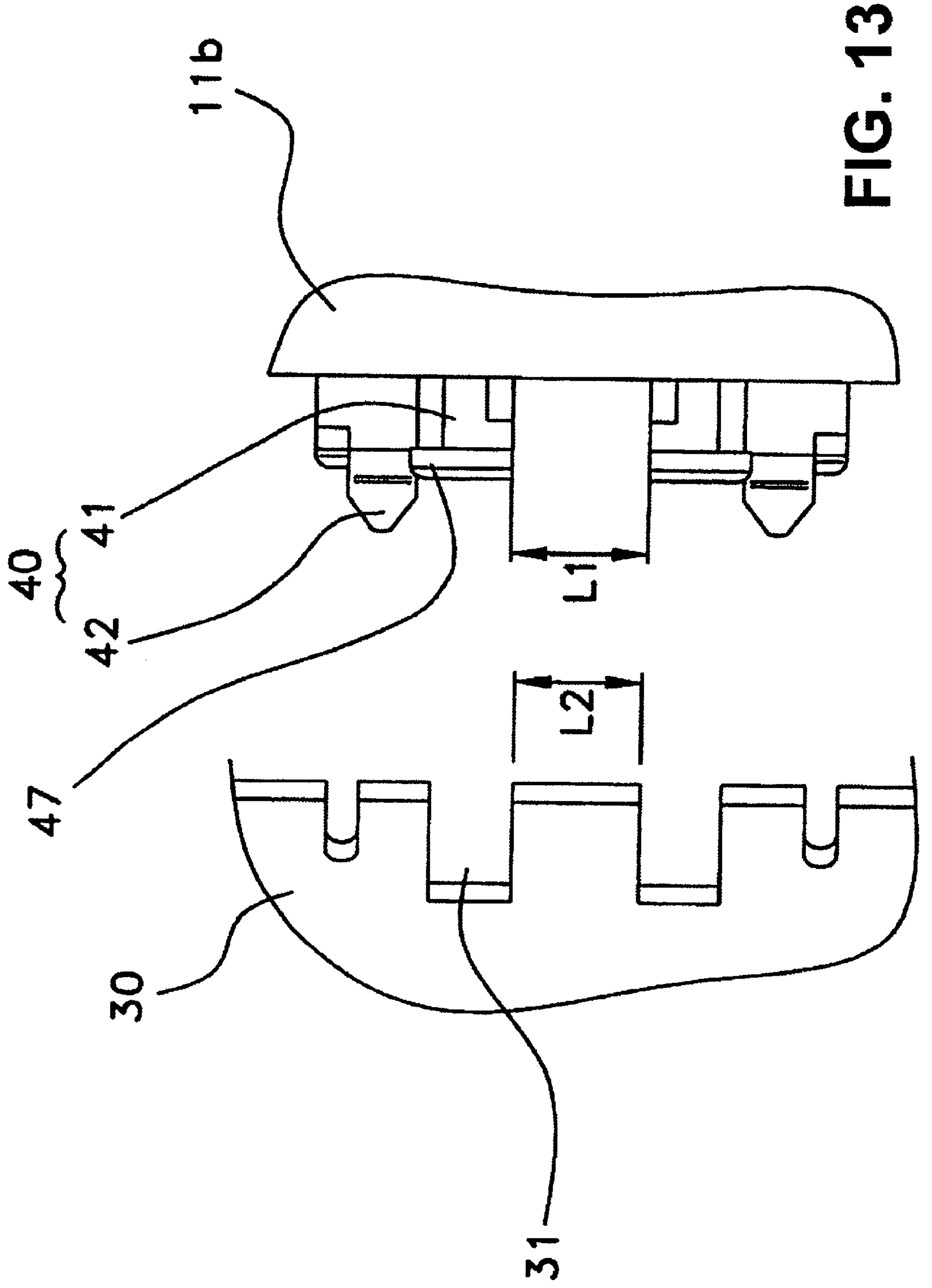

As an instance, as shown in FIGS. 12 and 13, the anti-release means can be provided in the form of an anti-release protrusion 47 in which the protrusions p1 are projected in a mutually opposed horizontal direction. The anti-release protrusion 47 has a configuration of contacting to one sides of the slide grooves 31 as in the foregoing embodiments to prevent release of the printed circuit board 30 from the upper hook pieces 31 during the assembly.

In the deflection yoke of the invention configured as above, the printed circuit board is assembled according to the following processes. Hereinafter, the processes will be described in reference to the anti-release means shown in FIGS. 8 and 9 of the various embodiments of the invention.

Figure 14:
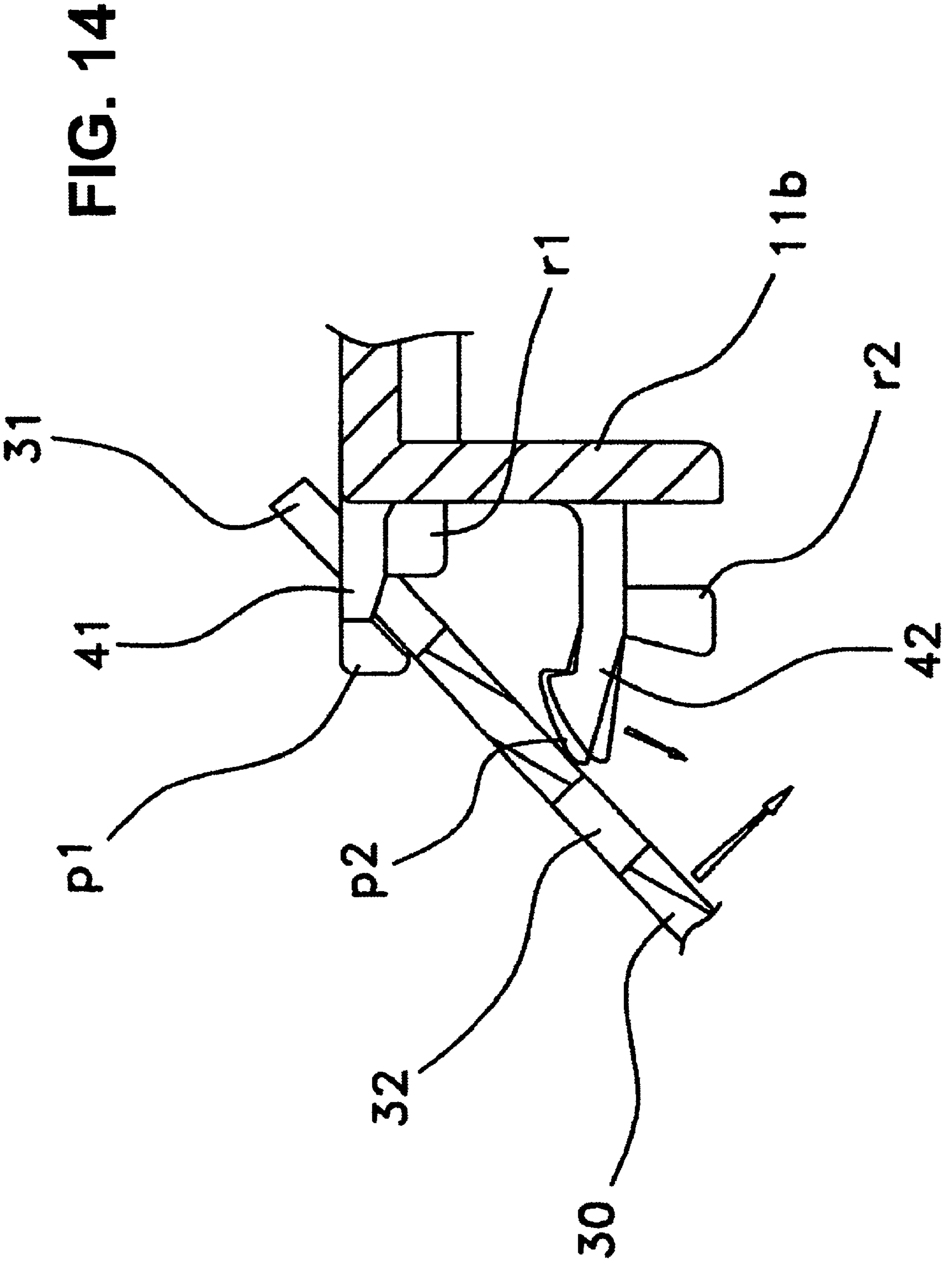
FIG. 14 is a side elevation view for showing assembly of a rear cover and the printed circuit board in a deflection yoke of the invention.

In order to assemble the foregoing printed circuit board 30 to the rear cover 11*b*, as shown in FIG. 14, the separator piece L2 formed in the upper end of the printed circuit board 30 is inserted into the space L1 provided in the upper hook pieces 41 as the upper end of the printed circuit 30 is obliquely inclined toward the rear cover 11*b*.

In this case, as the separator piece L2 of the printed circuit board 30 is inserted into the space L1, the printed circuit board is prevented from playing to other directions excepting for an insertion direction of the separator piece L2.

In sequence, when the upper end of the printed circuit board 30 is temporarily fixed by the pair of upper hook pieces 41, the rear end of the printed circuit board 31 is pivoted toward the rear cover 11*b* about the temporarily fixed portion, i.e., the upper hook pieces 41 and the slide grooves 31.

Therefore, the lower hook pieces 42 are inserted and coupled into the through-holes 32 while carrying out slightly elastic displacement along an inclined surface of the printed circuit board 30 and at the same time the upper end of the printed circuit board 30 is completely inserted and coupled to the upper hook pieces 41 by means of vertically positioning the printed circuit board 30 so that the processes of assembling the printed circuit board 30 are resultantly completed.

According to the deflection yoke of the invention as described hereinbefore, when the processes of assembly are carried out as the printed circuit board is temporarily fixed to the rear cover, the upper hook pieces having the anti-release means prevent the printed circuit board from easy release or separation so that the overall workability and productivity of assembly are remarkably improved as advantages.

What is claimed is:

1. A deflection yoke, comprising:

a coil separator having a screen portion coupled to a screen surface of a CRT, a rear cover and a neck portion extended from a central surface of said rear cover for being coupled to an electric gun of the CRT;

horizontal and vertical deflection coils provided in the inner and outer peripheries of said coil separator for forming horizontally and vertically deflected magnetic fields;

a printed circuit board coupled to said rear cover of the coil separator, and having a number of slide grooves with a certain size of separator piece in an upper part, said slide grooves being near an edge, and a plurality of through-holes at a certain interval under said slide grooves;

upper hook pieces projected from a side of said rear cover, each of said upper hook pieces having a rib at one end contacting to one side of said printed circuit board and a protrusion for penetrating one of said slide grooves to contact to said printed circuit board;

lower hook pieces provided at one side of said upper hook pieces, each of said lower hook pieces having a rib and a protrusion for penetrating said through-holes of the printed circuit board to support both sides thereof; and anti-release elements-projecting towards each other from protrusions of an adjacently arranged pair of the upper hook pieces to supportingly receive said separator piece provided between a pair of said slide grooves.

2. The deflection yoke according to claim 1, wherein said anti-release elements are anti-release fitting lugs integrally extended from said protrusions of the upper hook pieces.

3. A deflection yoke, comprising:

a coil separator having a screen portion coupled to a screen surface of a CRT, a rear cover and a neck portion extended from a central surface of said rear cover for being coupled to an electric gun of the CRT;

horizontal and vertical deflection coils provided in the inner and outer peripheries of said coil separator for forming horizontally and vertically deflected magnetic fields;

a printed circuit board coupled to said rear cover of the coil separator, and having a number of slide grooves with a certain size of separator piece in an upper part, said slide grooves being near an edge, and a plurality of through-holes at a certain interval under said slide grooves;

upper hook pieces projected from a side of said rear cover, each of said upper hook pieces having a rib at one ends contacting to one side of said printed circuit board and a protrusion for penetrating one of said slide grooves to contact to said printed circuit board;

lower hook pieces provided at one sides of said upper hook pieces, each of said lower hook pieces having a rib and a protrusion for penetrating said through-holes of the printed circuit board to support both sides thereof; and an anti-release element connecting said protrusions of an adjacently arranged pair of the upper hook pieces to supportingly receive said separator piece between said pair of upper hook pieces.

4. The deflection yoke according to claim 3, wherein said anti-release element an anti-release connector piece in which said protrusions of said pair of upper hook pieces are connected in a mutually opposed direction.

5. A deflection yoke, comprising:

a coil separator having a screen portion coupled to a screen surface of a CRT, a rear cover and a neck portion extended from a central surface of said rear cover for being coupled to an electric gun of the CRT;

horizontal and vertical deflection coils provided in the inner and outer peripheries of said coil separator for forming horizontally and vertically deflected magnetic fields;

a printed circuit board coupled to said rear cover of the coil separator, and having a number of slide grooves with a certain size of separator piece in an upper part, said slide grooves being near an edge, and a plurality of through-holes at a certain interval under said slide grooves;

upper hook pieces projected from a side of said rear cover, each of said upper hook pieces having a rib at one ends contacting to one side of said printed circuit board and a protrusion for penetrating one of said slide grooves to contact to said printed circuit board;

lower hook pieces provided at one sides of said upper hook pieces, each of said lower hook pieces having a rib and a protrusion for penetrating said through-holes of the printed circuit board to support both sides thereof; and anti-release element projecting away from each other protrusions of said upper hook pieces to contact to one sides of said slide grooves.

6. The deflection yoke according to claim 5, wherein said anti-release elements are anti-release fitting lugs which are integrally provided to said protrusions of the upper hook pieces.

* * * * *